Dec. 8, 1970 A. W. CHANDLER 3,545,278
AUTOMATIC DEAD WEIGHT PRESSURE GAUGE
Filed Dec. 30, 1968 3 Sheets-Sheet 3

INVENTOR.
ALANSON W. CHANDLER
BY
William S. Dorman
ATTORNEY

United States Patent Office 3,545,278
Patented Dec. 8, 1970

3,545,278
AUTOMATIC DEAD WEIGHT PRESSURE GAUGE
Alanson W. Chandler, 7707 E. 38th,
Tulsa, Okla. 74145
Filed Dec. 30, 1968, Ser. No. 787,869
Int. Cl. G01l 7/16
U.S. Cl. 73—419                                                                   10 Claims

ABSTRACT OF THE DISCLOSURE

An automatic dead weight gauge for measuring fluid pressures wherein a counterbalance member is operably connected with a pressure sensitive piston whereby compensation is automatically made upon any pressure change acting on the piston. In addition, means are provide wherein a direct visual reading of the pressure is constantly available. The counterbalance member is suspended in a liquid reservoir and the normal position thereof maintains the pressure sensitive piston at a known position for the normal fluid pressure acting thereon. In the event of a pressure increase on the piston, the weight of the counterbalance member is automatically instantaneously increased in accordance with the pressure change and a counter device is activated which provides a direct reading of the new or increased pressure on the piston. Conversely, a decrease in pressure acting on the piston results automatically in a decrease of weight of the counterbalance member and the counter or recording device is actuated for providing a visual reading of the new or decreased pressure.

---

This invention relates to improvements in pressure measuring devices and more particularly, but not by way of limitation, to an automatic dead weight pressure gauge providing extremely accurate pressure gauging results.

Dead weight pressure gauges in use today for determining fluid pressures within a pipeline, pressure vessel, or the like, normally comprise a piston having the pressure to be gauged directed against one face thereof and means for balancing the pressure by adding weighted members of known weights on the other side of the piston until the piston is balanced. The total weight of the combined weighted members may be utilized for determining the pressure acting on the piston. The weights are normally added manually and disposed on the device until sufficient weight has been achieved for balancing the piston and this often results in overcorrection requiring removal of some of the weights and replacement thereof by a weighted member of lesser weight. This is a mechanical method and device and the weighted members are each accurately gauged by weight standards. However, it will be readily apparent that regardless of the accuracy of the weight measurements of each weight member, it is still difficult to achieve extreme accuracy in pressure gauging using this method and means.

The present invention contemplates an automatic dead weight gauge wherein a balancing weight or counterbalance member is utilized in lieu of the weighted members to provide very accurate means and method of gauging the pressure acting on the pressure sensitive piston. The counterbalance member is operably connected to the pressure sensitive piston for compensating for or counterbalancing the pressure acting on the piston. The counterbalance is suspended in a fluid reservoir and the weight of the counterbalance plus the connecting members between the counterbalance and the piston is selected or calculated to maintain a normal "zero" position for the piston. An increase in pressure acting on the piston actuates a motor or the like for lowering the position of the fluid reservoir with respect to the counterbalance member, thus decreasing the displacement depth of the counterweight member within the fluid for increasing the weight of the counterbalance. The moment the weight of the counterbalance equals the pressure acting on the piston, the actuation of the motor is interrupted and the system is stabilized at the new pressure position for the piston. A counter member or recording device is operably connected with the motor to provide a visual reading, preferably in numbers, which is achieved or determined by the distance through which the fluid reservoir is moved to counterbalance the pressure change. The number on the counter thus corresponds to the increased pressure acting on the piston. In the event of a reduction in pressure acting on the piston, the procedure is reversed. In the words, the motor is activated for raising or elevating the fluid reservoir with respect to the counterweight member for increasing the displacement of fluid by the counterweight. This, in effect, reduces the weight of the counterbalance and as soon as the weight of the counterbalance equals the pressure acting on the piston the actuation of the motor is interrupted. The counter member now will provide a visual reading of the new pressure acting on the piston. The entire operation is automatic and is extremely sensitive in that substantially any increment of pressure increase or decrease on the piston is accurately compensated for by the counterbalance member. It is preferable that the fluid reservoir comprise a volume of mercury but there is no limitation as to the fluid which may be utilized.

It is an important object of this invention to provide an automatic dead weight gauge for measuring increases or decreases in a fluid pressure system.

Another object of this invention is to provide an automatic pressure measuring device of the dead weight type wherein extremely accurate pressure gauging is obtained.

A further object of this invention is to provide an automatic dead weight pressure gauge wherein substantially any increment of pressure increase or decrease is substantially instantaneously detected.

It is a still further object of this invention to provide an automatic dead weight pressure gauge wherein the fluid pressure in a pressure system may be visually determined with great accuracy.

A further object of this invention is to provide a novel automatic dead weight pressure gauge which is simple and efficient in operation and economical and durable in construction.

Other and further objects and advantageous features of the present invention will hereinafter more fully appear in connection with a detailed description of the drawings in which:

FIG. 5 is a sectional elevational view of the pressure chamber and piston as utilized in the invention.

Figure 1:
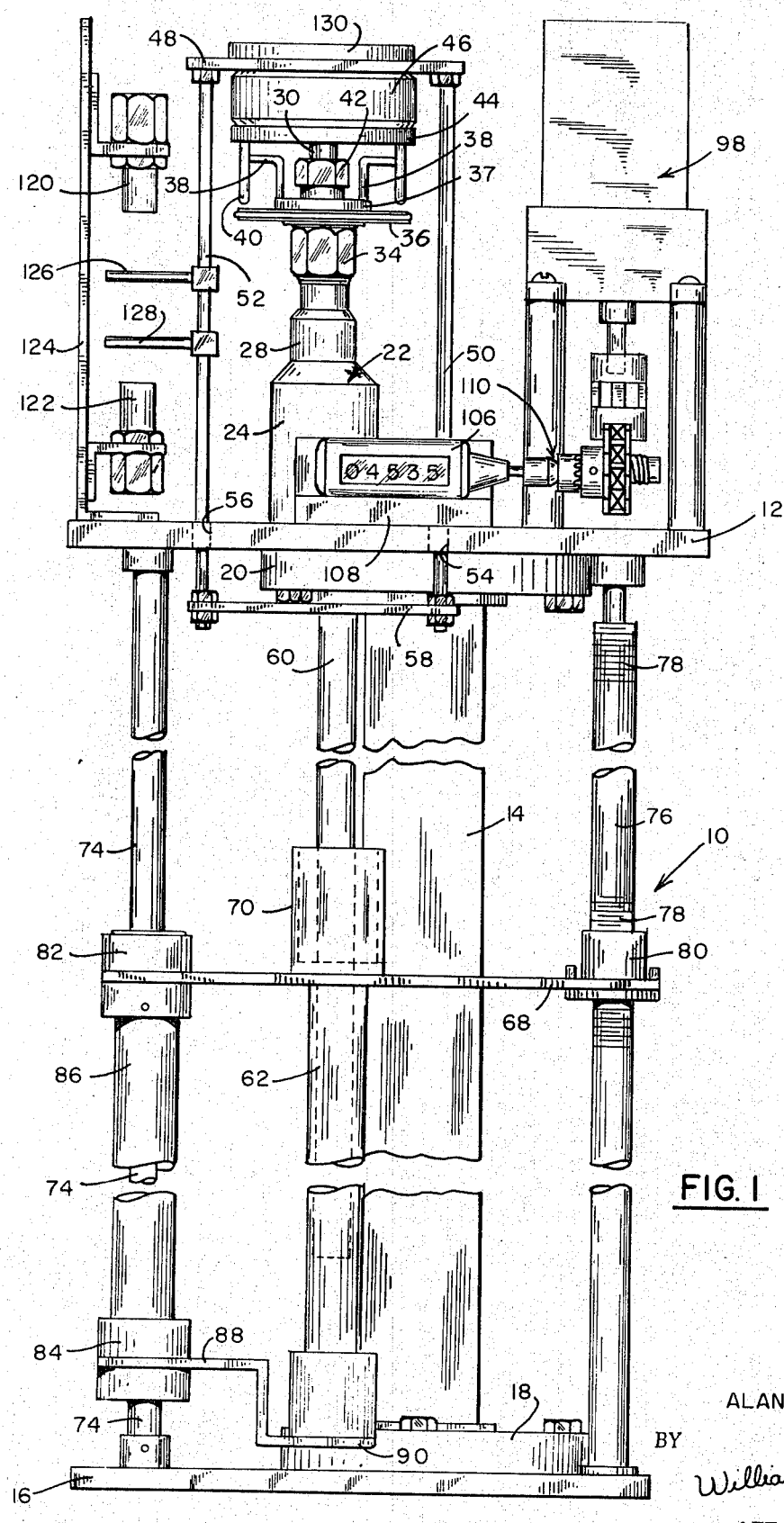
FIG. 1 is a broken front elevational view of a pressure measuring device embodying the invention.
Figure 2:
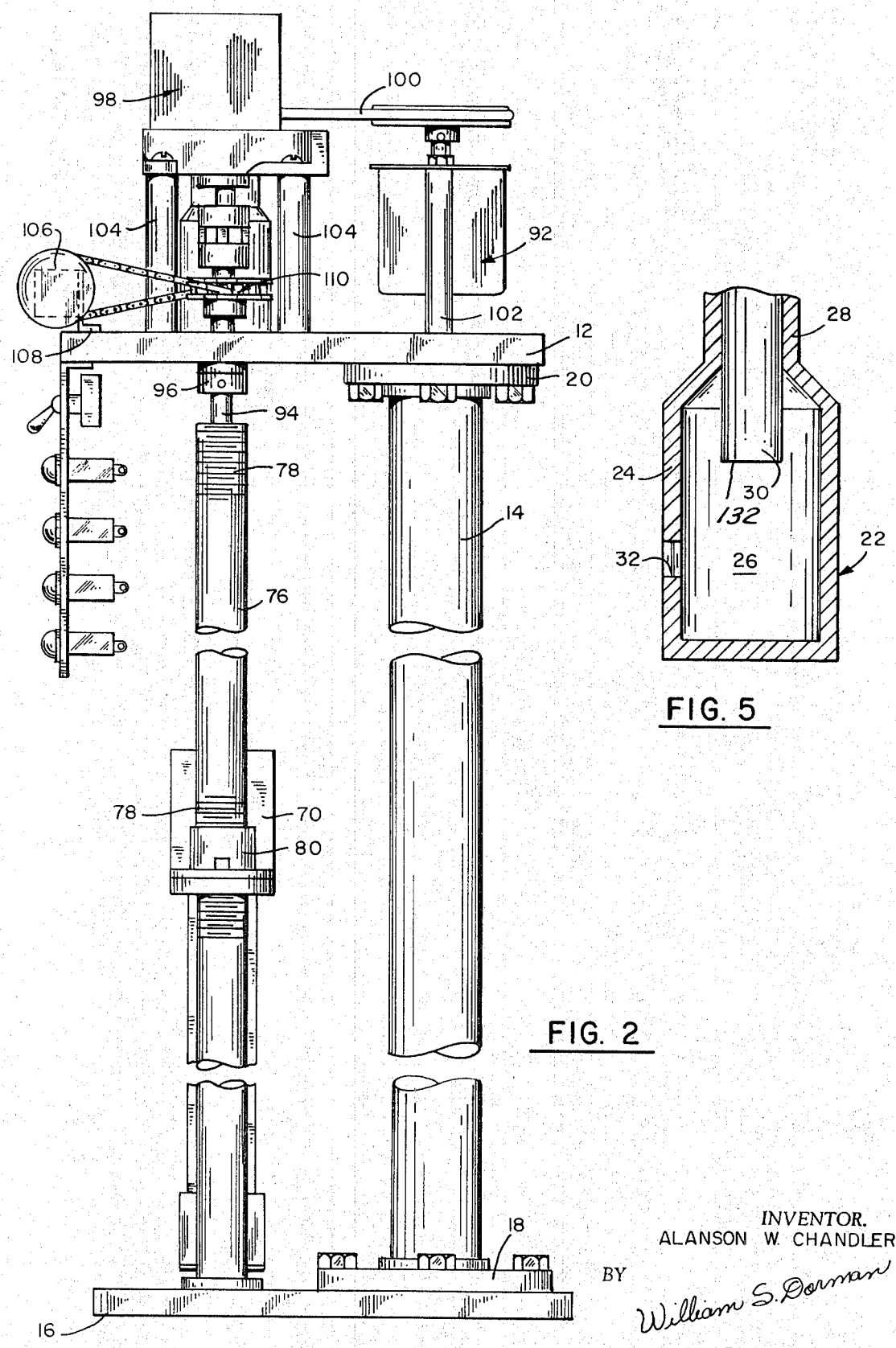
FIG. 2 is a side elevational view of a pressure measuring device embodying the invention.
Figure 3:
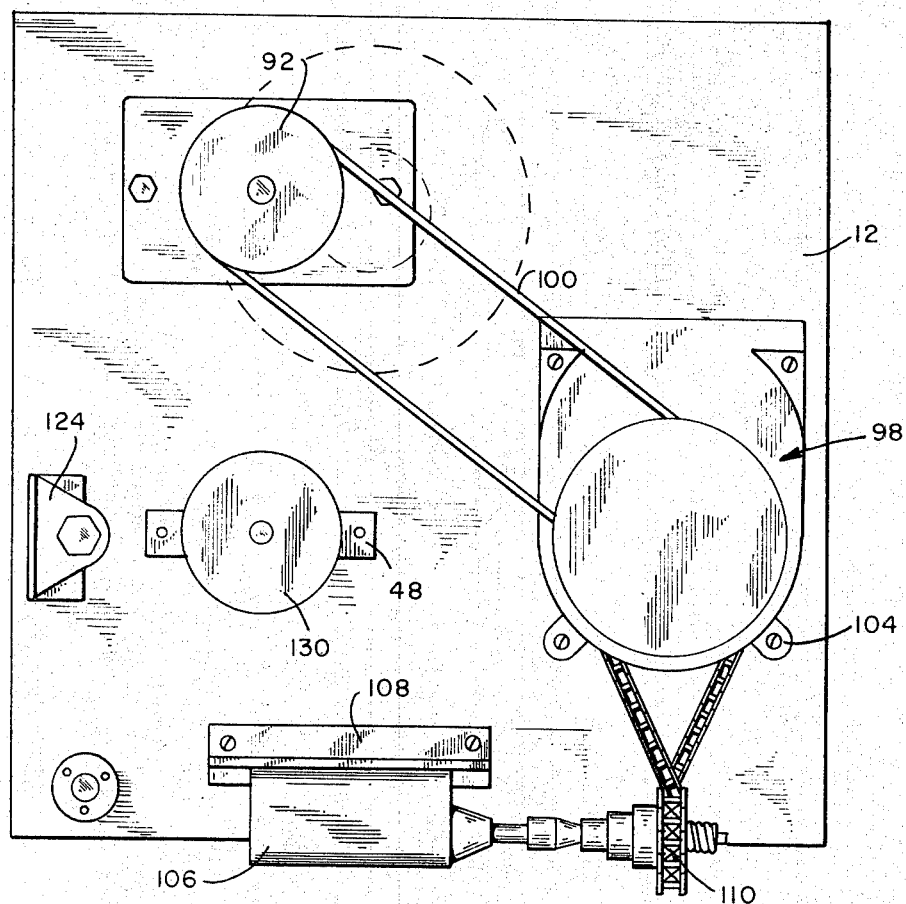
FIG. 3 is a plan view of a pressure measuring device embodying the invention.

Referring to the drawings in detail, reference character 10 generally indicates a pressure measuring device comprising a table or support plate 12 mounted on or supported by an upright leg 14 which in turn is secured to a base plate 16 in any suitable manner such as a flange fitting 18 bolted or otherwise secured to the plate 16. Of course, a similar flange fitting 20 may be bolted to the plate 12 for securing the plate to the leg 14 as is well known. The plate 12 is stationary and a pressure vessel 22 is mounted thereon in any well known manner (not shown).

The vessel 22 may be of any desired or suitable type and as shown herein, comprises a substantially cylindrical housing 24 having a pressure chamber 26 therein. The housing 24 is preferably provided with a reduced neck portion 28 at the upper end thereof for slidably receiving a reciprocal piston 30 therein. Of course, suitable sealing means (not shown) may be interposed between the outer periphery of the piston 30 and inner periphery of the neck 28 for precluding leakage of fluid therebetween as is well known. In addition, a port 32 is provided in the side wall of the housing 24 for receiving a suitable fitting (not shown) whereby the interior chamber 26 of the vessel 22 may be connected with the pipeline (not shown), pressure vessel (not shown), or the like, containing fluid pressure which is to be gauged by the apparatus 10. The fluid pressure to be gauged is communicated to the chamber 26 through the port 32 as is well known.

A collar 34 may be threadedly secured to the upper end of the reduced neck 28 if desired, for reciprocally receiving the piston 30 therethrough. The collar 34 may be provided with internal sealing means for precluding leakage of fluid around the piston, thus providing a stuffing box or stuffing gland for the vessel 22. An annular plate member 36 is secured to the upper end of the collar 34 in any suitable manner, and is stationary with respect to the collar 34 and vessel 22 as particularly viewed in FIG. 1. A plate member 37 is secured to or suitably disposed on the upper surface of the plate 36 and is provided with a plurality of upstanding substantially inverted L-shaped prongs 38. The outer extremity of each L-shaped prong 38 extends into or through a slot, recess, or the like (not shown), provided in downwardly depending contact members 40 and having spaced or upper and lower switches (not shown) therein. The contacts 40 are movable with respect to the prongs 38 for a purpose as will be hereinafter set forth.

A sleeve or collar 42 is secured above the plate 37 and reciprocally receives the piston 30 therethrough. It will be apparent that suitable sealing means (not shown) may be provided within the sleeve 42 for additional sealing around the reciprocal rod 30 if desired. A plate or disc member 44 is provided at the upper end of the rod 30 and is secured thereto in any well known manner (not shown) for movement simultaneously therewith. The contact members 40 are carried by the plate or disc 44 and extend downwardly therefrom in the normal position thereof and are positioned with respect to the plate 36 whereby the prongs 38 are normally disposed in a disengaged or noncontact position within the slots (not shown) or recesses (not shown) provided in the contact members 40 for a purpose as will be hereinafter set forth. A weight member or block 46 may be disposed on the disc 44 in order to provide a cumulative or total weight on the piston 30 as required for balancing of the piston in a manner and for a purpose as will be hereinafter set forth.

A transversely extending hanger member 48 is disposed on the weight or block 46 for supporting a pair of spaced downwardly extending guide rods 50 and 52. The rods 50 and 52 extend slidably through apertures 54 and 56, respectively, provided in the table 12. A cross member 58 is secured between the lower ends of the rods 50 and 52 in any suitable manner and is spaced below the plate 12. It is preferable to provide a minimum contact or engagement between the rods 50 and 52 and the walls of the apertures 54 and 56 to provide a minimum of friction upon reciprocal movement of the rods 50 and 52 with respect to the table 12.

Figure 4:
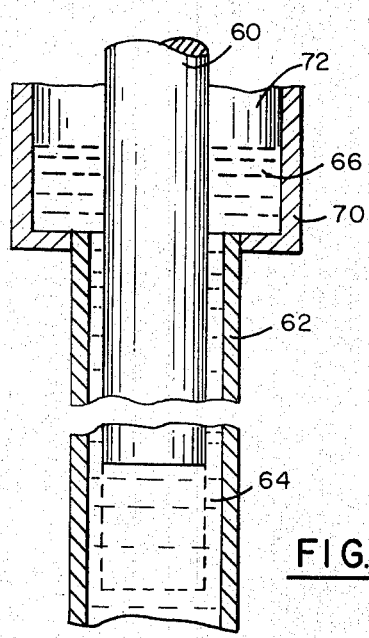
FIG. 4 is a broken sectional elevational view of a portion of the fluid reservoir and counterweight member utilized in the invention.

A counterweight or balance member 60 is carried by the cross member 58 and may be secured thereto in any suitable manner (not shown) for movement simultaneously therewith. The counterbalance 60 as shown herein, comprises a cylindrical rod of a preselected or known weight and of a preselected or known outer circumference. The counterbalance 60 extends downwardly below the table 12 and into a housing 62 having an internal chamber 64 (FIG. 4) for receiving and containing a fluid 66 therein. The fluid 66 is preferably mercury, but is not limited thereto.

The housing 62 as shown herein is tubular, but is not limited thereto, and is carried by a transversely extending cross member 68. The housing 62 is preferably provided with an enlarged portion 70 at the upper end thereof which is disposed on the upper surface of the cross member 68 and may be utilized for facilitating securing of the housing 62 to the cross member 68 and provides an enlarged internal area or chamber 72 for facilitating movement of the fluid 66 upon displacement thereof during reciprocation of the counterbalance member 60 within the housing 62.

The cross member 68 extends between a pair of spaced guide rods 64 and 76 which are suitably rigidly secured between the table 12 and base 16. The guide rod 76 is journaled for rotation in any suitable manner (not shown) and is externally threaded as shown at 78. A nut member or collar 80 is secured to the cross member 68 and receives the threaded rod 76 therethrough. The rod 76 and sleeve 80 may be provided with complementary threads, or the collar 80 may be of the ball-nut type whereby rotation of the rod 76 causes the nut 80 and cross member 68 to move longitudinally along the rod 76 as is well known. A bushing or sleeve 82 is provided on the cross member 68 oppositely disposed or spaced with respect to the nut 80 for receiving the rod 84 therethrough. A similar bushing or sleeve 84 is spaced below the bushing or sleeve 82 and is spaced therefrom by means of a sleeve 86 which is substantially concentrically disposed around the guide rod 74. A support bracket 88 is carried by the lower bushing 84 and is provided with a substantially horizontally extending arm 90 which engages or supports the lower end of the fluid reservoir housing 62. Upon rotation of the rod 76 in one direction, the nut 80 will move vertically upwardly on the rod 76. Simultaneously, the bushings 82 and 84 and sleeve 86 will move upwardly on the rod 74 carrying the support bracket 88 upwardly therewith. This elevates the fluid chamber 62 with respect to the base 16 and table 12. Conversely, rotation of the rod 76 in an opposite direction will cause the nut 80 to move vertically downwardly along the rod 76 for simultaneously moving the bushings 82 and 84 and sleeve 86 downwardly whereby the fluid reservoir housing 62 is lowered with respect to the base 16 and table 12.

The rod 76 is operably connected with a motor 92 in any well known manner, such as by a complementary rotatable shaft 94 and coupling members 96 which extend through the table 12 and into connection with a suitable gear reduction unit generally indicated at 98 which, in turn, may be driven by a pulley and belt generally indicated at 100 which is driven by the motor 92 whereby the shaft 76 will be rotated upon actuation of the motor 92. The motor 92 may be of any suitable type and is preferably an electric reversible motor and is mounted on the table 12 by suitable support members 102. The gear reduction unit 98 may also be mounted on the table 12 by suitable support members 104.

A counter device 106 is mounted on the table 12 in any suitable manner, such as by a support bracket 108 and is preferably a bidirectional electrical counter providing a numerical reading directly visible thereon. Devices of this type are well known and any such suitable counter unit may be utilized. The counter 106 is operably connected with the drive shaft 94 through suitable gearing generally indicated at 110 whereby the counter is actuated upon rotation of the shaft 94 and rod 76.

The motor 92 is electrically connected with the contact members 40 in any suitable manner (not shown) whereby engagement of the prong members 38 with one end of the slot or recess (not shown) provided in the contacts 40 energizes the motor for operation thereof in one direction, and whereby engagement of the prongs 38 with the opposite end of the slot energizes the motor 92 for operation in an opposite direction. When the prongs 38 are centrally disposed within the slot or are out of engagement with either end of the slot, the motor is not energized. In addition, a pair of spaced or upper and lower micro switches 120 and 122 are mounted on the base 12 by a suitable support bracket 124 and a pair of spaced contact members 126 and 128 are secured to the rod 52 and are interposed between the spaced micro switches 120 and 122. The micro switches are suitably electrically connected with the motor 92 whereby engagement of the contact 126 with the limit switch 120 upon an upward movement of the hanger 48 will interrupt the operation of the apparatus 10 and similarly engagement of the contact 128 with the lower limit switch 122 upon downward movement of the hanger 48 will interrupt the operation of the apparatus 10. This assures that thet pressure measuring device 10 will be limited to operation within the pressure limits for which the apparatus is calculated. Of course, it will be apparent that weight members such as shown at 130, may be disposed above the hanger 48 if desired for altering the operating limits of the apparatus 10 by changing the overall weight being supported by the piston 30.

OPERATION

The chamber 26 within the pressure vessel 22 is in constant communication with the interior of the pipeline, pressure vessel, or the like (not shown) containing the pressure to be gauged through a conduit (not shown) and the port 32. The pressure within the pressure to be gauged is thus constantly admitted to the chamber 26 and acts on the lower end 132 of the piston 30 as is well known. Normally, the desired pressure is known and, accordingly, the combined weights of the disc 44, block 46, rods 50 and 52, cross member 58, counterbalance 60 and weight members 130 are calculated and preselected to exactly counterbalance the known pressure in the chamber 26 and acting on the piston face 132. The normal weight of the counterbalance 60 is determined by the normal length of submergence thereof within the mercury or fluid 66. As long as the pressure acting on the piston face 132 remains at the known or preferred level, device 10 remains stationary and inactive or in the neutral position.

In the event of a pressure increase within the chamber 26 and acting on the piston face 132, the piston 30 will move upwardly, carrying with it the disc 44 and contacts 40. As soon as the contacts 40 have moved a sufficient distance upwardly for the prongs 38 to engage the lowermost switch in the slot (not shown) of the contact 40, the motor 92 will be actuated for rotating the rods 76 in a direction whereby the cross member 68 is moved downwardly with respect to the table 12. Of course, it is preferable that the length of travel of the prongs 38 for engaging the lowermost switch be relatively short in order to provide an extremely sensitive operation for the apparatus 10. The lowering of the cross member 68 is transmitted to the support member 88 through the bushings 82 and sleeve 86 and results in a lowering of the fluid reservoir vessel 62. This results in a withdrawal of the balance member 60 from the fluid reservoir for decreasing the displacement of the fluid therein and increasing the weight of the counterbalance member 60. The increased weight of the counterbalance member 60 is transmitted to the piston 30 through the cross member 58, rods 50 and 52 and hanger member 48. As soon as the weight of the counterbalance 60 has sufficiently increased to balance the pressure acting on the piston face at 132, the piston 30 will return to the normal position thereof with respect to the pressure vessel 22 and the prongs 38 will be returned to a known engagement or neutral position in the contacts 40. This stops the operation of the motor 92 and as long as the pressure remains at the increased level within the vessel 22, the apparatus will remain balanced.

The number of rotations of the rod 76 required for the lowering of the vessel 62 for the balanced position for the increased pressure in the vessel 22 provides a proportionate reading on the counter 106 with said reading being numerically equal to the pressure within the housing 22 and acting on the piston 132. Of course, the counter 106 may be regulated for providing a reading of the entire pressure acting on the piston face 132 or may be calibrated for providing a reading corresponding to the pressure per square inch within the vessel 22 as desired.

Conversely, if the pressure within the vessel 22 decreases whereby the pressure acting on the piston face 132 is lessened, the combined weight of the counterbalance member 60, cross member 48, rods 50 and 52, cross member 48, disc 44, block 46 and weights 130 will cause the piston 30 to lower or move downwardly within the vessel 22. When this occurs, the prongs 38 will engage the upper most switch of the slot in the contacts 40 for actuating or energizing the motor 92. The motor in this instance is actuated in a reverse direction and rotates the rod 76 in an opposite direction whereby the fluid reservoir vessel 62 is elevated with respect to the table 12. This causes the counterbalance 60 to be submerged to a greater depth within the fluid 66 and reduces the weight thereof. As soon as the weight is sufficiently reduced to balance the decreased pressure acting on the piston 30, the piston will return to the normal position thereof within the vessel and the prongs 38 will be moved out of engagement or to a neutral position with respect to the contacts 40. This stops the operation of the motor 92. The number of rotations of the rod 76 required for raising the vessel 62 will result in a reading on the counter 106 equal to the new or decreased pressure within the vessel 22 as hereinbefore set forth.

The limit switches 120 and 122 and contact members 126 and 128 are provided for maintaining the operation of the apparatus 10 within the calculated or designed limits thereof. The limits, of course, may be altered by varying the weight supported by or impressed upon the piston 30. The overall operation, of course, will be substantially identical regardless of the operating limits of the apparatus 10.

The device 10 may be installed for pressure gauging at any desired location. For example, a plurality of the devices 10 may be installed at spaced intervals along a remote pipeline, or the like. The device 10 is automatic in operation and requires no, or minimal, manual attendance. Each of the counter members 106 may be suitably connected with a distant control panel (not shown) by telemetering, or the like, wherein an identical reading will be simultaneously provided on the master control panel. The control panel may be installed at a monitoring station, or central location, which is normally under constant manned surveillance. Thus, when any undesirable pressure change is noted, the attendant at the monitoring station may dispatch proper service personnel to the trouble site.

It is to be understood that the means for raising and lowering the housing 62 and chamber 64 is not limited to the exact combination or arrangement depicted herein. Any suitable method and means may be provided for raising and lowering of the chamber 64 with respect to the rod or counter balance 60 in order to achieve the end result hereinbefore set forth. For example, the microswitches 120 and 122 may be replaced by suitable switches commonly known as proximity switches, with the uppermost proximity switch being suitably electrically connected with the motor 92 for rotation thereof in one direction and the lowermost proximity switch being electrically connected with the motor 92 for rotation thereof in an opposite direction. In this instance, raising of the piston 30 upon an increase of pressure in the chamber 26 will move the contact member 126 into the proximity of the uppermost proximity switch for energization thereof to activate the motor for rotation in the said one direction whereby the housing 62 is lowered with respect to the member 60, as hereinbefore set forth and for the same purpose. Conversely, lowering of the piston 30 upon a decrease of pressure in the chamber 26 will move the contact member 128 into the proximity of the lowermost proximity switch for energization thereof to activate the motor 92 for rotation in the said opposite direction whereby the housing 62 is raised with respect to the counterbalance 60 as hereinbefore set forth and to achieve the same result. In this particular arrangement it may be found preferable or desirable to provide a motor in combination with a gear reduction unit in lieu of the gear reducer 98, with the second being suitably mechanically connected with the piston 30, such as by a pulley and belt arrangement, in order to rotate the piston for reducing or substantially eliminating any static friction which may be present in the system. It will be apparent that in this type arrangement the complementary prongs 38 and contact member 40 may be utilized for transmitting rotation between the plate 36 and plate 44.

From the foregoing, it will be apparent that the present invention provides an automatic dead weight pressure gauge particularly designed and constructed for quickly and accurately gauging pressure differentials in a pressure system. The weight of the counterbalance member may be rapidly increased or decreased through infinite weight increments for balancing substantially any pressure within the pressure vessel in an efficient and accurate manner not heretofore possible. Furthermore, a counter member is automatically actuated simultaneously with any pressure change to provide an accurate reading for facilitating calculations of other necessary information required with regard to the pressure changes.

Whereas the present invention has been described in particular relation to the drawings attached hereto, it should be understood that other and further modifications, apart from those shown or suggested herein, may be made within the spirit and scope of this invention.

What is claimed is:

1. An automatic dead weight pressure gauge comprising a pressure sensitive reciprocal piston in communication with fluid pressure to be measured, counterweight means carried by the piston, a fluid reservoir movable with respect to the counterweight means and cooperating therewith for selective variation of the weight of the counterweight means, and means operable upon reciprocation of the piston for movement of the fluid reservoir to a position with respect to the counterweight means for balancing the forces acting on the piston.

2. An automatic dead weight pressure gauge as set forth in claim 1 wherein counter means is operably connected with the fluid reservoir moving means to provide a visual reading corresponding to the fluid pressure being measured.

3. An automatic dead weight pressure gauge as set forth in claim 1 wherein the counterweight means includes a weight member suspended from the piston having a normal position suspended within the fluid reservoir to provide a known weight for the counterweight means, said weight of said counterweight means being variable upon movement of the fluid reservoir with respect thereto.

4. An automatic dead weight pressure gauge as set forth in claim 3 wherein vertical upward movement of the fluid reservoir decreases the weight of the counterweight means, and vertical downward movement of the fluid reservoir increases the weight of the counterweight means.

5. An automatic dead weight pressure gauge as set forth in claim 1 wherein the counterweight means includes a hanger member carried by the piston movable therewith, a counterweight member suspended from the hanger member and suspendable within the fluid reservoir, said movement of said fluid reservoir with respect to said counterweight member providing variation of the weight of the counterweight member.

6. An automatic dead weight pressure gauge as set forth in claim 1 wherein the last mentioned means comprises a motor operably connected with the piston and actuated upon vertical movement of the piston, threaded means operably connected between the motor and the fluid reservoir for vertical movement of the fluid reservoir upon actuation of the motor.

7. An automatic dead weight pressure gauge as set forth in claim 6 wherein counter means is operably connected to the threaded means for actuation upon rotation thereof to provide a visual reading corresponding to the fluid pressure to be measured.

8. An automatic dead weight pressure gauge comprising a stationary support means, a pressure vessel mounted on said stationary support means, a pressure sensitive piston disposed in said pressure vessel in constant communication with fluid pressure to be measured, hanger means carried by said piston and movable therewith, counterweight means carried by said hanger means, movable fluid reservoir means disposed for receiving the counterweight means therein, means providing vertical reciprocation for said fluid reservoir, means operable upon reciprocation of said piston for actuation of said fluid reservoir moving means, and counter means operably connected with said fluid reservoir moving means to provide visual indication of the fluid pressure to be measured.

9. An automatic dead weight pressure gauge as set forth in claim 8 wherein the means operable upon reciprocation of the piston includes a reversible motor, contact means operably connected between the piston and the motor whereby the motor is actuated in one direction upon upward movement of the piston and operable in a reverse direction upon downward movement of the piston.

10. An automatic dead weight pressure gauge as set forth in claim 8 wherein the fluid reservoir moving means comprises threaded means rotatable in one direction upon upward movement of the piston for moving the fluid reservoir downwardly with respect to the counterweight means for increasing the weight thereof, and said threaded means being rotatable in an opposite direction upon downward movement of the piston for elevating the fluid reservoir with respect to the counterweight means to decrease the weight thereof.

References Cited

UNITED STATES PATENTS

| | | | |
|---|---|---|---|
| 1,935,508 | 11/1933 | Lanham | 73—419 XR |
| 2,564,470 | 8/1951 | Dickey et al | 73—419 |
| 3,495,426 | 2/1970 | Huot | 73—4 |

LOUIS R. PRINCE, Primary Examiner

W. A. HENRY II, Assistant Examiner

U.S. Cl. X.R.

73—4